(12) United States Patent
Dhanabalan et al.

(10) Patent No.: US 10,530,683 B2
(45) Date of Patent: Jan. 7, 2020

(54) HIGH-QUALITY ADAPTIVE BITRATE VIDEO THROUGH MULTIPLE LINKS

(71) Applicant: Citrix Systems, Inc., Fort Lauderdale, FL (US)

(72) Inventors: Praveen R. Dhanabalan, Bangalore (IN); Tarun K. Hukmichand, Karnataka (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 269 days.

(21) Appl. No.: 15/252,888

(22) Filed: Aug. 31, 2016

(65) Prior Publication Data

US 2018/0063202 A1  Mar. 1, 2018

(51) Int. Cl.
| | |
|---|---|
| H04L 12/725 | (2013.01) |
| H04L 29/06 | (2006.01) |
| H04N 21/2343 | (2011.01) |
| H04N 21/238 | (2011.01) |
| H04N 21/24 | (2011.01) |
| H04N 21/63 | (2011.01) |
| H04N 21/6373 | (2011.01) |
| H04N 21/845 | (2011.01) |
| H04L 12/707 | (2013.01) |
| H04L 12/853 | (2013.01) |

(52) U.S. Cl.
CPC .......... *H04L 45/3065* (2013.01); *H04L 45/24* (2013.01); *H04L 47/2416* (2013.01); *H04L 65/4084* (2013.01); *H04L 65/608* (2013.01); *H04L 65/80* (2013.01); *H04N 21/2343* (2013.01); *H04N 21/23805* (2013.01); *H04N 21/2402* (2013.01); *H04N 21/631* (2013.01); *H04N 21/6373* (2013.01); *H04N 21/8456* (2013.01)

(58) Field of Classification Search
CPC ..................................... H04L 45/3065
See application file for complete search history.

(56) References Cited

U.S. PATENT DOCUMENTS

| | | | | |
|---|---|---|---|---|
| 2013/0305263 | A1* | 11/2013 | Go ........................ | G06F 13/00 719/327 |
| 2015/0350276 | A1* | 12/2015 | Karlsson ................ | H04L 65/60 709/231 |
| 2016/0088521 | A1* | 3/2016 | Ho ........................ | H04W 28/08 455/453 |
| 2016/0142510 | A1* | 5/2016 | Westphal .............. | H04L 67/322 709/219 |

* cited by examiner

*Primary Examiner* — Nicholas P Celani
(74) *Attorney, Agent, or Firm* — Fox Rothschild LLP; Robert J. Sacco; Carol E. Thorstad-Forsyth (57) ABSTRACT

Delivery of high quality video in an adaptive bit rate (ABR) download session is achieved using obtained using lower quality communication paths. The method involves detecting that an ABR download session of a video is in a steady-state condition. If so a further determination is made as to whether there is sufficient pre-fetch time available to download an (N+1)th video segment of the video using at alternative connection path through a virtual WAN having a lower quality than a first connection path through the virtual WAN. If sufficient pre-fetch time is available, the (N+1)th video segment is prefetched using at least the second connection path instead of the first connection path.

12 Claims, 4 Drawing Sheets

HIGH-QUALITY ADAPTIVE BITRATE VIDEO THROUGH MULTIPLE LINKS

BACKGROUND

Statement of the Technical Field

The technical field of this disclosure comprises data communications and more particularly communication of video data through computer data networks.

Description of the Related Art

In a packet network data is communicated from a source computer to a destination computer by means of data packets, which are sometimes called datagrams. A typical data network can comprise numerous network nodes comprising routers which are used to facilitate a flow of data between a source and destination node. The routers have ports for receiving incoming data packets and transmitting outgoing data packets. The packets are received from a source node or another router and are then transmitted to another router or to a destination node.

Wide Area Network (WAN) virtualization logically binds multiple multiprotocol label switching (MPLS) and broadband paths into a single logical path. With WAN virtualization, quality of service (QoS) rules, path selection and traffic shaping can be applied to ensure that high-priority applications always perform well. WAN virtualization can also ensure that all bandwidth on all paths is fully utilized.

With WAN Virtualization, multiple WAN connections are managed by middleboxes or network appliances that perform WAN virtualization. These devices are sometimes called WAN virtualization appliances. The WAN virtualization appliances are generally deployed in pairs across two geographically separated locations connected through multiple links. The devices can measure the link quality and can tunnel packets across multiple links between the device pairs. WAN virtualization algorithms executing in the middleboxes perform dynamic, real-time analysis of data traffic to choose optimal routes to achieve required bandwidth at a relatively low cost as compared to a private or dedicated WAN communication links. Accordingly, WAN Virtualization can facilitate deployment of many types of software applications which require substantial communication bandwidth.

SUMMARY

Embodiments concern a method for delivering a high quality video in an adaptive bit rate (ABR) download session using lower quality communication paths. The method involves detecting that an ABR download session of a video is in a steady-state condition, where the download session is utilizing a first connection path through a virtual WAN implemented by a first and second network appliance. A further determination is made as to whether there is sufficient pre-fetch time available to download an (N+1)th video segment of the video during a time period which begins at a time concurrent with a download period associated with of an Nth video segment in process of being downloaded, completes at or before an estimated time when download of the (N+1)th video segment would otherwise be completed using the first connection path, and is facilitated using at least one second connection path through the virtual WAN having a lower quality than the first connection path through the virtual WAN. If sufficient pre-fetch time is available, the (N+1)th video segment is prefetched using at least the second connection path instead of the first connection path.

According to one aspect, the steady state condition can be determined by comparing a download bit rate of the Nth video segment, to a current segment video encoding rate and a next higher segment video encoding rate. The steady state condition can further be determined by comparing the download bit rate of the Nth video segment to the next lower quality segment video encoding rate.

Embodiments also concern a network appliance for delivering high quality a video in an adaptive bit rate (ABR) download session using lower quality communication paths. The network appliance includes at least one electronic circuit configured to detect that an ABR download session is in a steady-state condition, where the download session is being implemented using a first connection path through a virtual WAN implemented by a first and second network appliance to download a video. The network appliance then determines whether there is sufficient pre-fetch time available to download an (N+1)th video segment of the video during a period which begins at a time concurrent with a download period associated with of an Nth video segment in process of being downloaded, completes at or before an estimated time when download of the (N+1)th video segment would otherwise be completed using the first connection path, and is performed using at least one second connection path through the virtual WAN having a lower quality than the first connection path through the virtual WAN. If so, the (N+1)th segment is prefetched by the network appliance using at least the second connection path instead of the first connection path.

BRIEF DESCRIPTION OF THE DRAWINGS

Embodiments will be described with reference to the following drawing figures, in which like numerals represent like items throughout the figures, and in which.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

Quality of Experience (QoE) can be particularly important in the area of video data transmission. However, a better quality of video viewing experience generally means higher audio/video bitrate (i.e., the number of bits that are conveyed or transmitted per unit of time), which translates to higher bandwidth utilization of WAN links. These higher bandwidth utilization requirements usually also mean higher data transmission costs. An embodiment disclosed herein improves the performance of such networks by using low quality links (high latency, high packet drop or jittery paths) while still delivering high quality videos. Consequently high bandwidth link requirements are reduced and such resources are freed up for other priority traffic.

Adaptive Bit Rate (ABR) streaming can be used to enhance QoE when downloading certain types of multimedia data, such as video data. In a system utilizing ABR, the multimedia data (e.g. video data) is encoded at the source to form two or more different video data streams (S1, S2, . . . Sn), where each is encoded at a different video bit rate. These rates are sometimes referred to herein as video encoding rates. Each of the streams is then separated at the source into a plurality of smaller video segments. These segments usually range in length from between about two seconds and ten seconds. A client computer begins the video download by receiving segments from a video stream corresponding to an initial bit rate. If bandwidth conditions permit (i.e., if available bandwidth will permit higher download speeds) or if the bandwidth is insufficient to support the current bit rate, then the client machine will subsequently request to receive from the server video segments from a bit rate stream which were encoded at a different bit rate. The selected bit rate may be higher or lower respectively depending on the available bandwidth. If bandwidth conditions deteriorate, segments from lower bit rate streams can be selected. If bandwidth conditions improve, segments from higher bitrate streams can be selected. So ABR delivers video segments to a user by dynamically altering the selection of the video segments from different bit streams encoded at different bit rates, while also ensuring real time playback.

According to one embodiment ABR video segments can be advantageously pre-fetched by a middlebox or network appliance over lower quality links and under certain conditions. The pre-fetched segment can be stored at the middlebox closest to the client and then delivered to the client computer when the request for such segment arrives. The decision to pre-fetch a video segment can be based on the link qualities of every link between a pair of middleboxes, the video encoding rate of a video segment which is currently being downloaded, and the time remaining until the request for the next video segment arrives from a client machine. Whenever possible, the next required video segment is prefetched using one or more lower-quality links through the virtual WAN.

Figure 1:
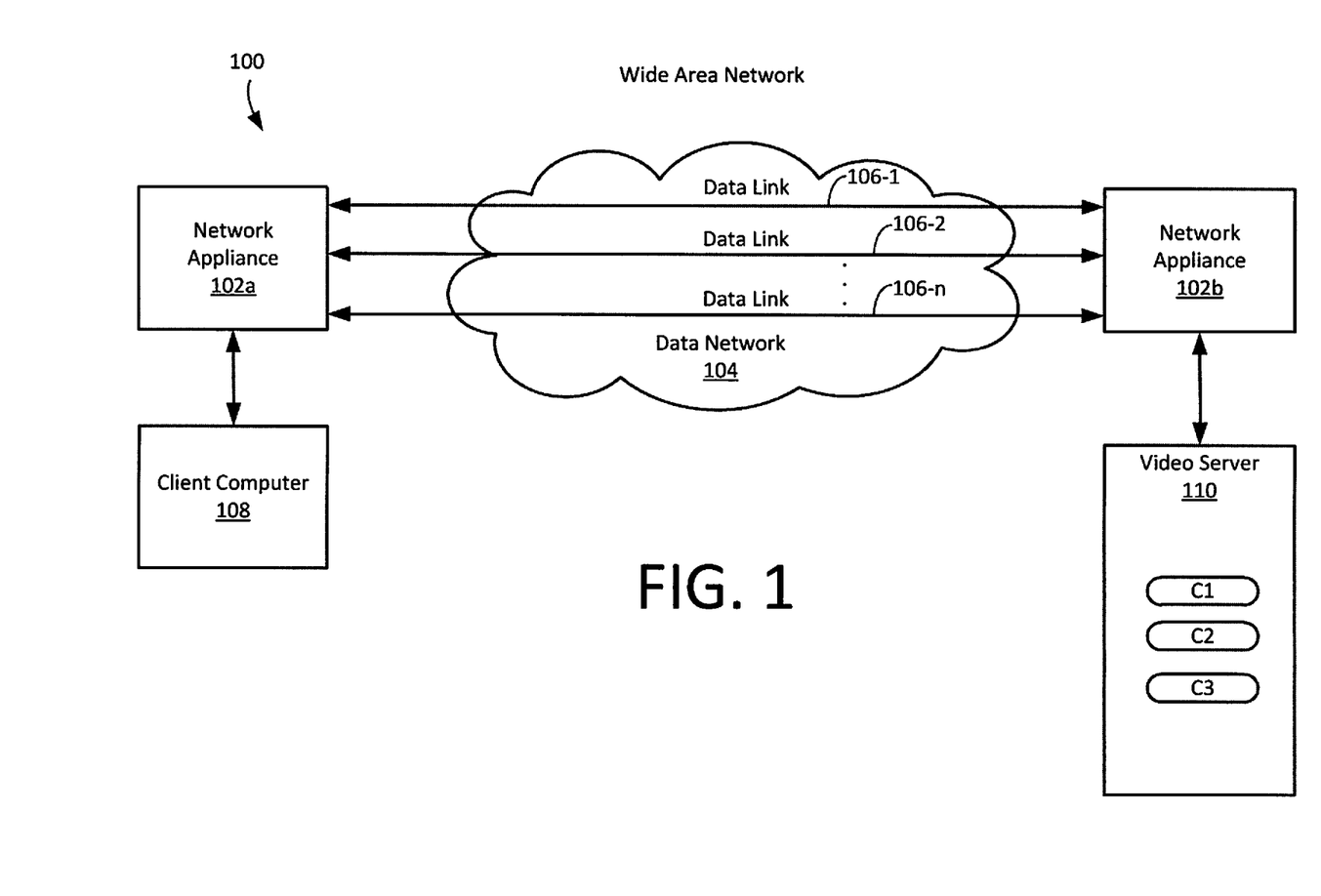
FIG. 1 is an exemplary diagram of a computer data communication network showing certain a pair of WAN virtualization appliances in a video download session.

Embodiments will now be described in further detail with regard to FIGS. 1-3. An exemplary embodiment of a virtual WAN is shown in FIG. 1. Middleboxes which perform WAN virtualization are generally deployed in pairs across two geographically separated locations connected through multiple links. Accordingly, the virtual WAN 100 in this embodiment is comprised of network appliances 102a, 102b and a data network 104 comprising multiple data communication links 106-1, 106-2, . . . 106.n. In the exemplary embodiment shown, the virtual WAN is used to facilitate data communications between a client computer 108 and a video server 110. Although only a single client computer 108 is shown connected to the network appliance 102a, it should be understood that such network appliance can facilitate virtual WAN services for a plurality of client computers 108 (not shown). Likewise, a plurality of computing machines (e.g. servers) can be connected to the network appliance 102b.

The network appliances 102a, 102b in virtual WAN 100 will measure the quality of the various links between the two appliances. For example, in some embodiments the source (sending) appliance can add tags to each packet with information about the time sent and its order in the packet flow. The destination (receiving) appliance can then read these tags and use the data to measure transit time, congestion, jitter, packet loss and other information about the performance and health of the path. The appliances share this information, and use queuing theory and predictive behavioral statistical modeling to create a "map" of all of the paths in the WAN. This information can be continuously updated with information from recent packets communicated between the two appliances. These techniques allow the WAN appliances 102a, 102b to continuously measure and monitor the performance, quality and health of every MPLS and broadband connection in the WAN, and apply that knowledge to providing quality of service, path selection, traffic shaping and other services. As explained below in further detail, the information gathered using these techniques can also be used to facilitate video data pre-fetch using lower quality links.

Figure 2:
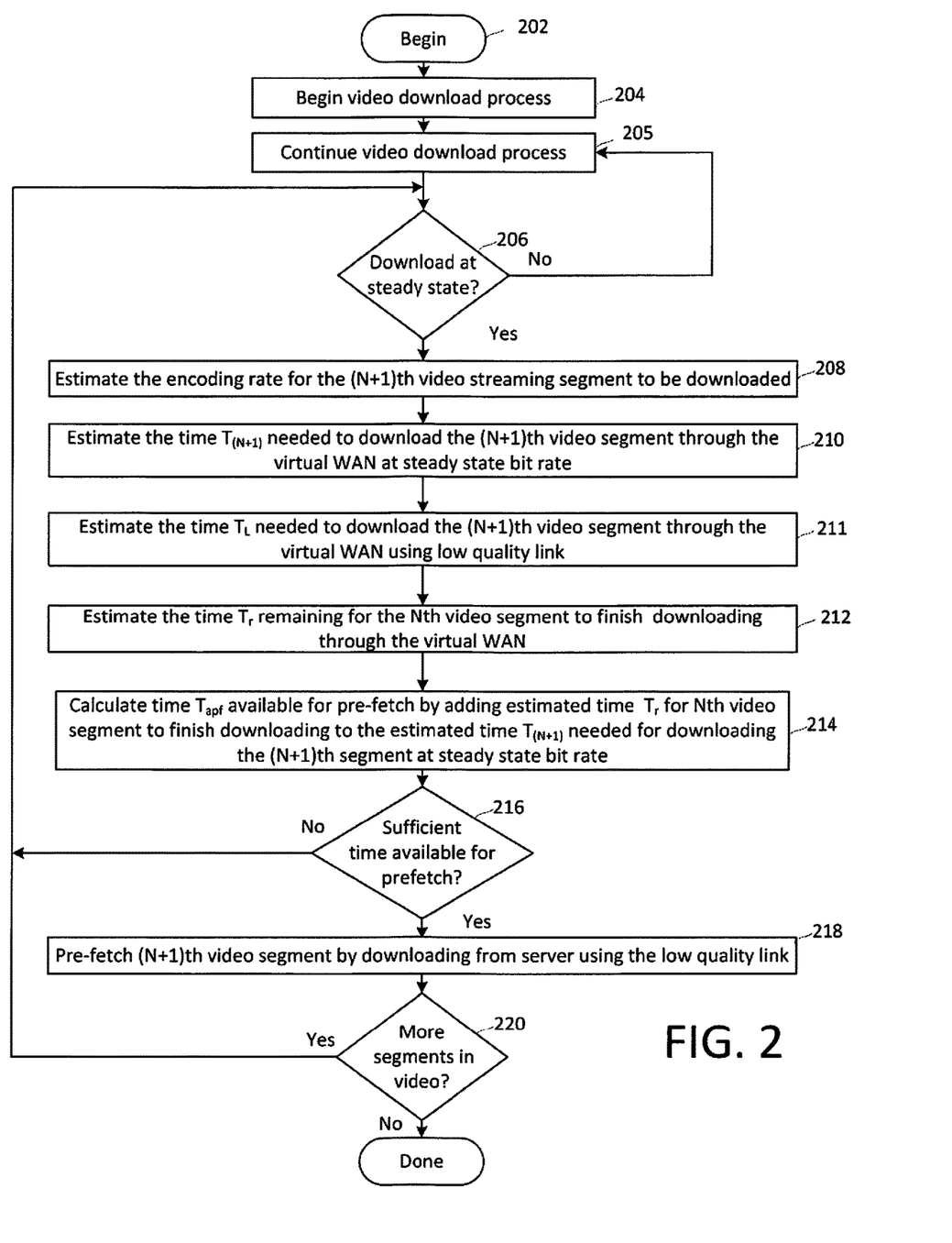
FIG. 2 is a flow chart that is useful for understanding certain aspects of a method to facilitate high quality video downloads using lower quality data links.

Referring now to FIG. 2, a method is disclosed whereby WAN virtualization appliances (e.g. network appliances 102a, 102b) can utilize their map of available paths to facilitate usage of lower quality data links within the data network 104 for communicating video data. These lower quality data links can be selectively used in place of more expensive higher quality data links which are normally required for communicating high quality video data. Consequently, demands placed upon high quality (e.g., high bandwidth) data links are reduced and such resources are freed up for other priority traffic.

The process can begin at 202 and continues at 204 where an Adaptive Bit Rate (ABR) data streaming session can be initiated. ABR data streaming is well known in the art and therefore will not be described here in detail. However, it will be appreciated that the ABR data streaming session can be initiated by a request from client computer 108 directed to the video server 110. This request can be communicated through the network appliances 102a, 102b. The request can result in the initiation of the ABR data streaming session by the video server, whereby one or more video segments are communicated by the video server 110 to the client computer 108. These video segments are communicated through the virtual WAN 100 using network appliances 102a, 102b and the data network 104. As the data streaming session continues at 205, the client computer 108 will periodically initiate requests for additional video segments to be displayed at the client computer 108. These requests will be transmitted to the network appliance 102a. The network appliance 102a will respond by communicating such requests to the video server 110 through network appliance 102b using a WAN virtualization protocol.

After a period of time, the streaming process download will arrive at a steady state condition. According to an embodiment, the occurrence of such steady state condition is determined by comparing the video encoding rate of a current video segment, a measured download bit rate, and a video encoding rate of the next higher quality and lower quality video segment (as compared to the actual download bit rate). More particularly, when one of the below formulas hold true for a video segment which is being downloaded, then a steady state condition as defined herein is satisfied:

(1) Current segment video encoding rate<Download bit rate<Next higher quality segment video encoding rate; or
(2) Current segment video encoding rate>Download bit rate>Next lower quality segment video encoding rate
wherein:
"Current segment video encoding rate" is the bit rate at which the current segment was encoded at the source;
"Download bit rate" is the actual rate at which the download is currently proceeding through the virtual WAN;
"Next higher quality segment video encoding rate" refers to the next higher encoding rate of video segments available at the source as compared to the current video encoding rate; and
"Next lower quality segment bit rate" refers to the next lower encoding rate of video segments available at the source as compared to the current video encoding rate.

For example, assume that the server 110 has video segments from video streams at three different video encoding rates or quality levels as shown in FIG. 1. The three video encoding rates (C1, C2 and C3) in this example respectively correspond to actual video encoding rates of 300 kilobits per second (kbps), 600 kbps and 1.2 megabits per second (Mbps). For purposes of this example, further assume that the actual download bitrate through the virtual WAN is 1 Mbps and C1 is the bit rate at which the current segment was encoded. The encoding rate of the current segment is C1, so in this scenario the encoding rate of next higher quality segment bit rate is C2. Note that there is no "Next lower quality segment bit rate" in this scenario since C1 is the lowest encoding rate of video segments available at the video server 110. Applying formulas (1) and (2), we obtain the following results:

$$300 \text{ kbps } (C1) < 1 \text{ Mbps} < 600 \text{ kbps } (C2) \text{ (false)}, \quad (1)$$

$$300 \text{ kbps } (C1) > 1 \text{ Mbps} > (\text{No segments have encoding rate lower than } C1) \text{ (false)} \quad (2)$$

So we can conclude in this first scenario that steady state conditions do not exist. But in a second scenario, if we assume that the bit rate of the current segment is C2, then at least formula (1) is true:

$$600 \text{ kbps } (C2) < 1 \text{ Mbps} < 1.2 \text{ Mbps } (C3) \quad (1)$$

So in this second scenario, the video streaming process would be in a steady state condition as defined herein. Further, the steady state bit rate would be identified or defined as the video encoding rate of the current video segment (C2 in this example).

At 206, a determination is made as to whether the download is proceeding at "steady state". The determination can be performed using formulas (1) and (2) as outlined above. If the download is not proceeding at the steady state condition (206: No), the process returns to 205 and downloading continues in accordance with a conventional ABR protocol. However, if a steady state condition is identified (206: Yes), then the process continues to 208. At 208 the video encoding rate is estimated for the (N+1)th video streaming segment which will be downloaded. In an embodiment, this estimate can be based on the actual download rate of the current (Nth) segment, and the various video encoding rates (e.g., C1, C2, and C3) of the video segments which are available at the server. The goal in this point in the process is to anticipate the video encoding rate that will be correspond to next video segment request from the client computer 108.

The information concerning the video encoding rate for the next segment can be estimated in any suitable manner. For example, each video segment that is downloaded will have certain associated metadata. The metadata is usually a file which defines the characteristics and locations of the video segment. It also includes information such as video encoding rate, video resolution and so on. So this metadata for a video segment includes information sufficient to determine a video encoding rate of that segment, and can be accessed by the network appliance (e.g. network appliance 102a). If the system is in a steady state, the encoding rate of the (N+1)th video segment can be expected to be the same as the encoding rate of previously downloaded video segments (e.g. the Nth video segment or (N−1)th video segment. So the estimate for the encoding rate of the (N+1) video encoding rate can also be based on the video encoding rate specified by the metadata in such previously downloaded video segments.

The process continues at 210. An estimate is determined with regard to the amount of time which will be needed to download the (N+1)th video segment (having the video encoding rate estimated in 208). This duration of time $T_{(N+1)}$ is estimated based on the steady state bit rate through the virtual WAN 100 as defined above. The time $T_{(N+1)}$ is schematically illustrated in FIG. 3 which shows a series of video segments S1 . . . S(N), S(N+1) in a video download. In this example, S(N) is considered the Nth video segment and S(N+1) is the (N+1)th video segment. To get the size of the (N+1)th segment, the meta data can be parsed to find an approximate size of the segment. A conventional HTTP method can be used to request such metadata from the video server. For example, an HTTP HEAD method can be can be used by a network appliance 102a to request that the metadata associated with a particular video segment be sent to it. The metadata received will contain information specifying the amount of data content associated with the segment.

Thereafter in 211, a time $T_L$ is estimated. The time $T_L$ is the amount of time needed to download the (N+1)th video segment through the virtual WAN using one or more relatively lower quality links. The lower quality links referenced herein can be understood to include links having one or more path attributes (such as bandwidth, latency, loss and jitter) which are of lower quality as compared to the attributes of a link path through the virtual network which is otherwise necessary to maintain the steady state download conditions. Usually, such paths will have a lower cost associated with them as compared to a higher quality path used to maintain optimal video download speed.

After $T_{(N+1)}$ and $T_L$ are estimated in 210, a further estimate is performed is performed in 212 with regard to the remaining amount of time $T_r$ required for the Nth video segment to finish downloading to the network appliance 102a, through the virtual WAN 100. This time $T_r$ can be determined based on several factors such as the current download data rate through the virtual WAN 100, the amount of data comprising the Nth video segment, and the amount of preceding time during which the download of the Nth video segment has already been proceeding. This amount of preceding time can be determined by a comparison of a time when the download of such Nth video segment began and a current time. Of course, other methods can also be employed to generate an estimate of the duration of time remaining for the Nth video segment to complete its download and the invention is not intended to be limited in this regard.

At 214, the estimated times $T_{(N+1)}$ and $T_r$ are added together. As shown in FIG. 3, this sum $T_{(N+1)}+T_r$ is the duration of time $T_{apf}$ that is actually available for the (N+1)th video segment to be pre-fetched using available lower quality links. At 216 a determination is made as to whether the actual time available for pre-fetch $T_{apf}$ exceeds the amount of time $T_L$ that will be required to download the (N+1)th segment using the available lower quality links ($T_{apf} \geq T_L$). The download of the (N+1)th segment must be completed before the request for the (N+1)th segment arrives from the client computer 108. The timing of such request will generally correspond to the time when the download is completed for the Nth segment. So a determination can be made at 216 as to whether sufficient time is available to complete the download using the lower quality link. This concept is illustrated in FIG. 3 which shows sufficient time is available when $T_{apf}$ is in fact greater than $T_L$.

If sufficient time is available to perform the pre-fetch using the lower quality links (216: Yes) then the process continues to 218 where the (N+1)th video segment is pre-fetched by downloading same from the video server using the available lower quality links through the virtual WAN 100. If not (216: No) then the process returns to 206 and continues as described above.

As an example, assume that 3 seconds are required to download the (N+1)th video segment, and 1 second is remaining in the current download of the Nth video segment. At 216 a determination is made as to whether the (N+1)th segment can be downloaded in the low quality link in 3+1 secs. If so (216: Yes), a pre-fetch is performed using one or more lower quality links or connections to the remote virtual WAN appliance.

At 220 a determination is made as to whether there are more video segments in the current video being downloaded. If so (220: Yes) then the process returns to 206 and continues as described herein. If all segments have been downloaded (220: No) then the process can terminate or perform other actions.

Figures 3, 4:
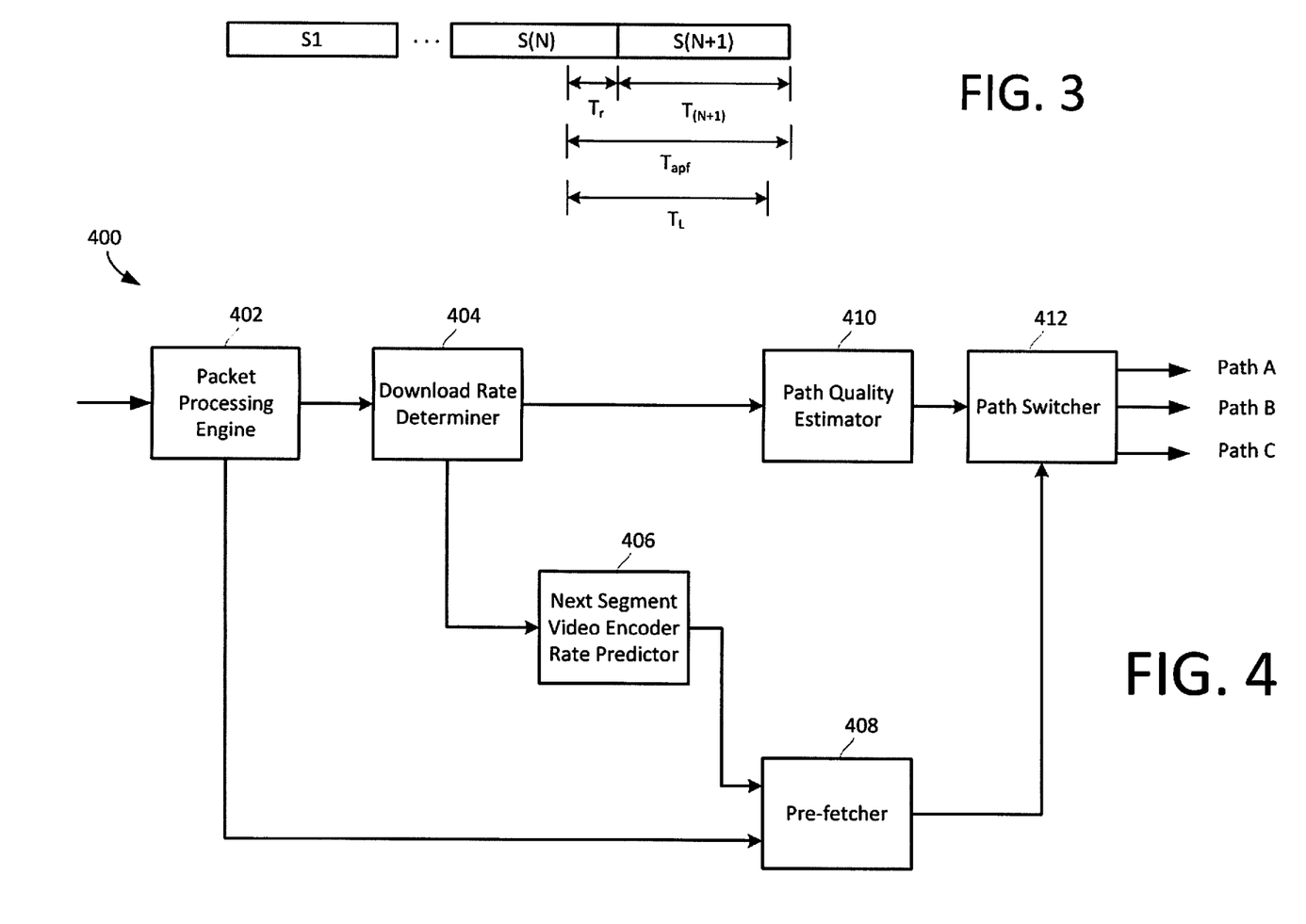
FIG. 3 is a timing diagram that is useful for understanding the flow chart in FIG. 2.
FIG. 4 is a conceptual diagram that is useful for understanding a conceptual architecture of a computer system for carrying out the methods disclosed herein.

Referring now to FIG. 4, there is illustrated a conceptual block diagram of a network appliance 400 for carrying out certain processing as described herein with respect to FIG. 2. For example, the network appliance 400 can represent an exemplary architecture for a network appliance 102a in FIG. 1. The appliance 400 can include at least a packet processing engine 402, a download rate determiner 404, a next segment video encoder rate predictor 406, a pre-fetcher 408, a path quality estimator 410 and a packet switcher 412 for selecting among various network paths (e.g. paths A, B, and C).

The packet processing engine 402 can perform WAN virtualization actions to facilitate a virtual WAN as described herein. These actions can include reading tags inserted in data packets by a different network appliance (e.g. network appliance 102b). The information contained therein can thereafter be used by one or more modules in the network appliance to ascertain attributes or characteristics of various links or paths between the network appliances. These attributes can include transit time, link congestion, jitter, packet loss and other information about the performance and health of the path. This information can be continuously updated with information from recent packets communicated between the two virtual WAN appliances. Accordingly, the packet processing engine 402 can collect data necessary to monitor the performance, quality and health of every MPLS and broadband connection in the WAN, and apply that knowledge for implementing the methods described herein.

The download rate determiner 404 can determine the rate at which the current video segment is being delivered to the client computer. For example, this function can be accomplished using the tag information extracted from packets by the packet processing engine 402. The next segment video encoder rate predictor 406 estimates the video encoding rate for the (N+1)th video streaming segment which will be downloaded. In an embodiment, this estimate can be based on the actual download rate of the current (Nth) video segment, and the various video encoding rates (e.g., C1, C2, and C3) of the video segments which are available at the server. This module can also determine whether a steady state condition exits with respect to the ABR streaming.

The pre-fetcher 408 performs prefetching operations as described herein with respect to block 218 in FIG. 2. More particularly, pre-fetcher 408 pre-fetches the (N+1)th video segment by downloading same from video server using one or more relatively low quality links. These relatively low quality links or connections can be identified using the path quality estimator 410. The path quality estimator can identify or map these low quality links based on the packet data gathered by the packet processing engine 402. The data packets which are actually communicated using the low quality data paths are directed to the proper connection or link paths by packet switcher 412.

The virtual WAN appliances described herein can comprise a computer networking device (e.g. a network appliance) comprised of one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Embodiments of the inventive arrangements disclosed herein can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device.

Figure 5:
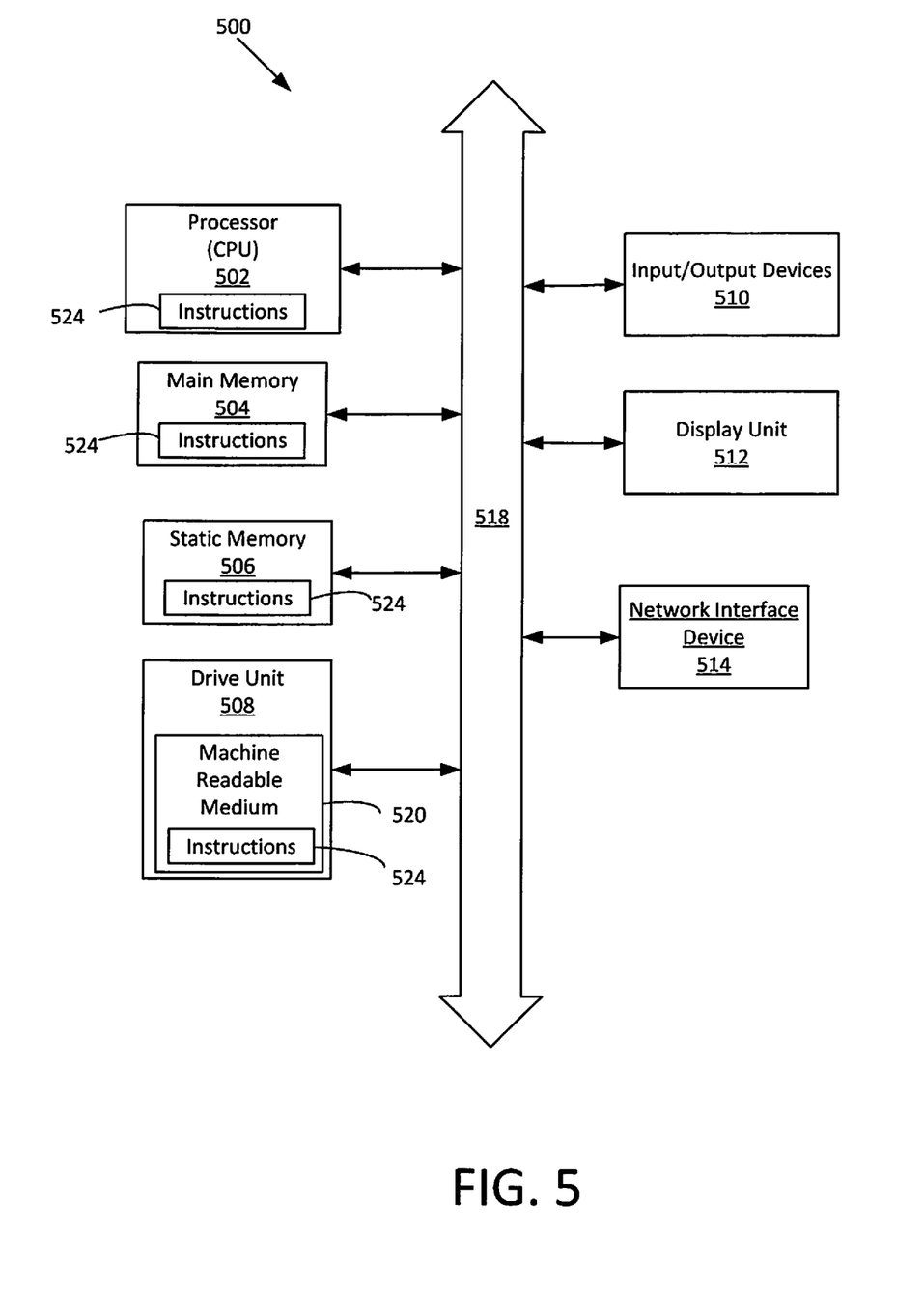
FIG. 5 is a block diagram of a computer system that can be used to implement one or more of the devices disclosed herein.

Referring now to FIG. 5, there is shown a hardware block diagram comprising an exemplary computer system 500. The machine can include a set of instructions which are used to cause the computer system to perform any one or more of the methodologies discussed herein. In a networked deployment, the machine can function as a server or client computer. In one or more embodiments, the exemplary computer system 500 can function as the network appliance 102a, 102b, or 400 described herein. In some embodiments, the computer 500 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The computer system 500 is comprised of a processor 502 (e.g. a central processing unit or CPU), a main memory 504, a static memory 506, a drive unit 508 for mass data storage and comprised of machine readable media 520, input/output devices 510, a display unit 512 (e.g. a liquid crystal display (LCD), a solid state display, or a cathode ray tube (CRT)), and a network interface device 514. Communications among these various components can be facilitated by means of a data bus 518. One or more sets of instructions 524 can be stored completely or partially in one or more of the main memory 504, static memory 506, and drive unit 508. The instructions can also reside within the processor 502 during execution thereof by the computer system. The input/output devices 510 can include a keyboard, a mouse, a multi-touch surface (e.g. a touchscreen) and so on. The network interface device 514 can be comprised of hardware components and software or firmware to facilitate wired or wireless network data communications in accordance with a network communication protocol utilized by a data network 104.

The drive unit 508 can comprise a machine readable medium 520 on which is stored one or more sets of instructions 524 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Computer system 500 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout the specification may, but do not necessarily, refer to the same embodiment.

Furthermore, the described features, advantages and characteristics disclosed herein may be combined in any suitable manner in one or more embodiments. One skilled in the relevant art will recognize, in light of the description herein, that the embodiments can be practiced without one or more of the specific features or advantages of a particular embodiment. In other instances, additional features and advantages may be recognized in certain embodiments that may not be present in all embodiments.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the embodiments have been illustrated and described with respect to one or more implementations, equivalent alterations and modifications will occur to others skilled in the art upon the reading and understanding of this specification and the annexed drawings. In addition, while a particular feature of an embodiment may have been disclosed with respect to only one of several implementations, such feature may be combined with one or more other features of the other implementations as may be desired and advantageous for any given or particular application. Thus, the breadth and scope of the embodiments disclosed herein should not be limited by any of the above described embodiments. Rather, the scope of the invention should be defined in accordance with the following claims and their equivalents.

We claim:

1. A method for delivering a high quality video in an adaptive bit rate (ABR) download session using lower quality communication paths, comprising:
    determining whether an ABR download session of a video, utilizing a first connection path through a virtual WAN implemented by a first and second network appliance, is in a steady-state condition, where the steady state condition is satisfied when at least one of the following statements is true:
        Nth video segment encoding rate<Download bit rate of Nth video segment<Next higher quality segment video encoding rate; and Nth video segment encoding rate>Download bit rate of Nth video segment>Next lower quality segment video encoding rate;

continue downloading the video in accordance with an ABR protocol, when-a determination is made that the ABR download session is not in the steady-state condition; and performing the following operations when a determination is made that the ABR download session is in the steady-state condition:

defining a steady state bit rate as a video encoding rate of the Nth video segment;

identifying one or more first links through the virtual WAN including at least one path attribute which is of a lower quality as compared to a corresponding path attribute of one or more second link paths through the virtual WAN which is necessary to maintain the steady state bit rate;

determining whether there is sufficient pre-fetch time available to download an (N+1)th video segment of the video using one of the identified first links during a period beginning at a time concurrent with a download period associated with an Nth video segment in process of being downloaded, completing at or before an estimated time when download of the (N+1)th video segment would otherwise be completed using the first connection path, and using at least one second connection path through the virtual WAN that is implemented by the first and second network appliances and has a lower quality than the first connection path through the virtual WAN;

using the second connection path instead of the first connection path to download the (N+1)th video segment when a determination is made that there is sufficient pre-fetch time available; and using the first connection path to download the (N+1)th video segment when a determination is made that sufficient time is not available.

2. The method according to claim 1, wherein said determination of whether there is sufficient pre-fetch time available to download an (N+1)th video segment further comprises estimating an encoding rate for the (N+1)th video segment.

3. The method according to claim 1, wherein said determination of whether there is sufficient pre-fetch time available to download an (N+1)th video segment further comprises estimating a time $T_{(N+1)}$ needed to download the (N+1)th video segment through the virtual WAN at a steady state bit rate corresponding to the steady state condition.

4. The method according to claim 1, wherein said determination of whether there is sufficient pre-fetch time available to download an (N+1)th video segment further comprises estimating a time $T_L$ needed to download the (N+1)th video segment through the virtual WAN using at least the second connection path which has a lower quality as compared to the first connection path.

5. The method according to claim 1, wherein said determination of whether there is sufficient pre-fetch time available to download an (N+1)th video segment further comprises estimating a time $T_r$ which remains for the Nth video segment to finish downloading through the virtual WAN.

6. The method according to claim 5, wherein said determination of whether there is sufficient pre-fetch time available to download an (N+1)th video segment further comprises calculating a time $T_{apf}$ by adding the estimated time $T_r$ and an estimated time $T_{(N+1)}$ needed to download the (N+1)th video segment through the virtual WAN at a steady state bit rate corresponding to the steady state condition.

7. A network appliance for delivering high quality video in an adaptive bit rate (ABR) download session using lower quality communication paths, comprising
at least one electronic circuit configured to:
determine when an ABR download session, which is utilizing a first connection path through a virtual WAN implemented by a first and second network appliance to download a video, is in a steady-state condition, where the steady-state condition is satisfied when at least one of the following statements is true:

Nth video segment encoding rate<Download bit rate of Nth video segment<Next higher quality segment video encoding rate; and Nth video segment encoding rate>Download bit rate of Nth video segment>Next lower quality segment video encoding rate;

continue downloading the video in accordance with an ABR protocol, when a determination is made that the ABR download session is not in the steady-state condition; and perform the following operations when a determination is made that the ABR download session is in the steady-state condition:

define a steady state bit rate as a video encoding rate of the Nth video segment;

identify one or more first links through the virtual WAN including at least one path attribute which is of a lower quality as compared to a corresponding path attribute of one or more second link paths through the virtual WAN which is necessary to maintain the steady state bit rate;

determine whether there is sufficient pre-fetch time available to download an (N+1)th video segment of the video using one of the identified first links during a period beginning at a time concurrent with a download period associated with an Nth video segment in process of being downloaded, completing at or before an estimated time when download of the (N+1)th video segment would otherwise be completed using the first connection path, and using at least one second connection path through the virtual WAN that is implemented by the first and second network appliances and has a lower quality than the first connection path through the virtual WAN;

use at least the second connection path instead of the first connection path to download the (N+1)th video segment, when sufficient pre-fetch time is available; and use the first connection path to download the (N+1)th video segment, when sufficient time is not available.

8. The network appliance according to claim 7, wherein the at least one electronic circuit determines whether there is sufficient pre-fetch time available to download an (N+1)th video segment by estimating an encoding rate for the (N+1)th video segment.

9. The network appliance according to claim 7, wherein said determination of whether there is sufficient pre-fetch time available to download an (N+1)th video segment further comprises estimating with the at least one electronic circuit a time $T_{(N+1)}$ needed to download the (N+1)th video segment through the virtual WAN at a steady state bit rate corresponding to the steady state condition.

10. The network appliance according to claim 7, wherein said determination of whether there is sufficient pre-fetch time available to download an (N+1)th video segment further comprises estimating with the at least one electronic circuit a time $T_L$ needed to download the (N+1)th video segment through the virtual WAN using at least the second connection path which has a lower quality as compared to the first connection path.

11. The network appliance according to claim 7, wherein said determination of whether there is sufficient pre-fetch time available to download an (N+1)th video segment further comprises estimating with the at least one electronic circuit a time $T_r$ which remains for the Nth video segment to finish downloading through the virtual WAN.

12. A method for delivering high quality video in an adaptive bit rate (ABR) download session using lower quality communication paths, comprising
  detecting that an ABR download session of a video using a first connection path through a virtual WAN implemented by a first and second network appliance, is in a steady-state condition, where the steady-state condition is satisfied when at least one of the following statements is true:
    Nth video segment encoding rate<Download bit rate of Nth video segment<Next higher quality segment video encoding rate; and
    Nth video segment encoding rate>Download bit rate of Nth video segment>Next lower quality segment video encoding rate;
  when the steady state condition does not exist, continuing a download of the video in accordance with an ABR protocol;
  when the steady state condition exists, performing the following operations
    defining a steady state bit rate as a video encoding rate of the Nth video segment;
    identifying one or more first links through the virtual WAN including at least one path attribute which is of a lower quality as compared to a corresponding path attribute of one or more second link paths through the virtual WAN which is necessary to maintain the steady state bit rate;
    determining whether there is sufficient pre-fetch time available to download an (N+1)th video segment of the video using one of the identified first links, which comprises an alternative connection path through a virtual WAN, in at least partial concurrence with an Nth video segment;
    using at least the alternative connection path instead of the first connection path to download the (N+1)th video segment, if sufficient pre-fetch time is available; and
    using the first connection path to download the (N+1)th video segment, if sufficient pre-fetch time is not available;
  wherein the alternative connection path is implemented by the first and second network appliances and is of a lower quality than the first connection path, and wherein the pre-fetch time is sufficient if the (N+1)th video segment can be completely downloaded using the alternative connection path before an estimated time when download of the (N+1)th video segment would otherwise be completed using the first connection path.

* * * * *